May 10, 1938.  T. RAPP  2,116,934

WEIGHING AND PACKAGING MACHINE

Filed April 17, 1935   3 Sheets-Sheet 1

INVENTOR,
THEODORE RAPP.
By Martin P. Smith, ATTY.

May 10, 1938.   T. RAPP   2,116,934
WEIGHING AND PACKAGING MACHINE
Filed April 17, 1935    3 Sheets-Sheet 2
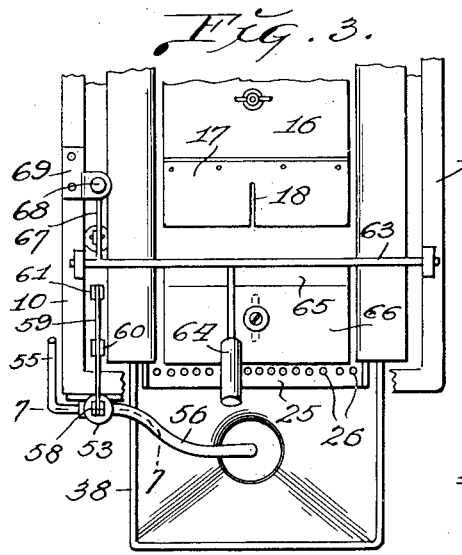
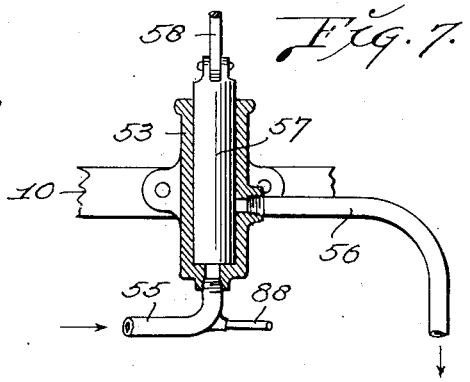
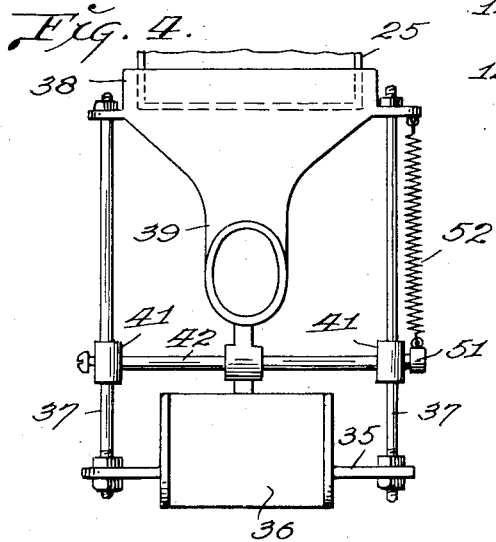
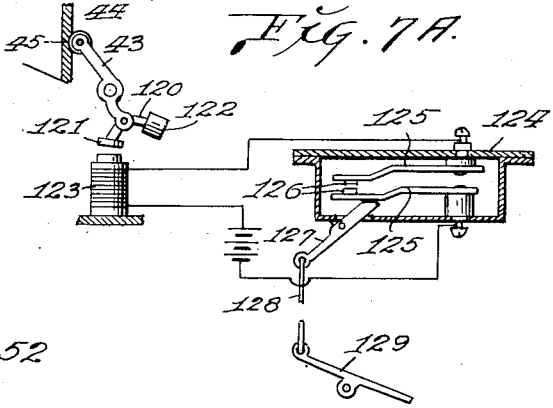
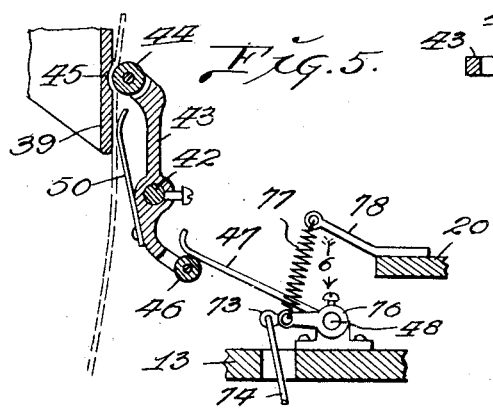
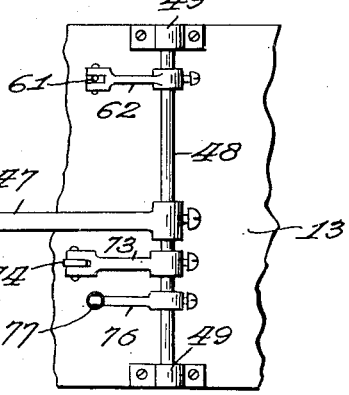
INVENTOR.
THEODORE RAPP.

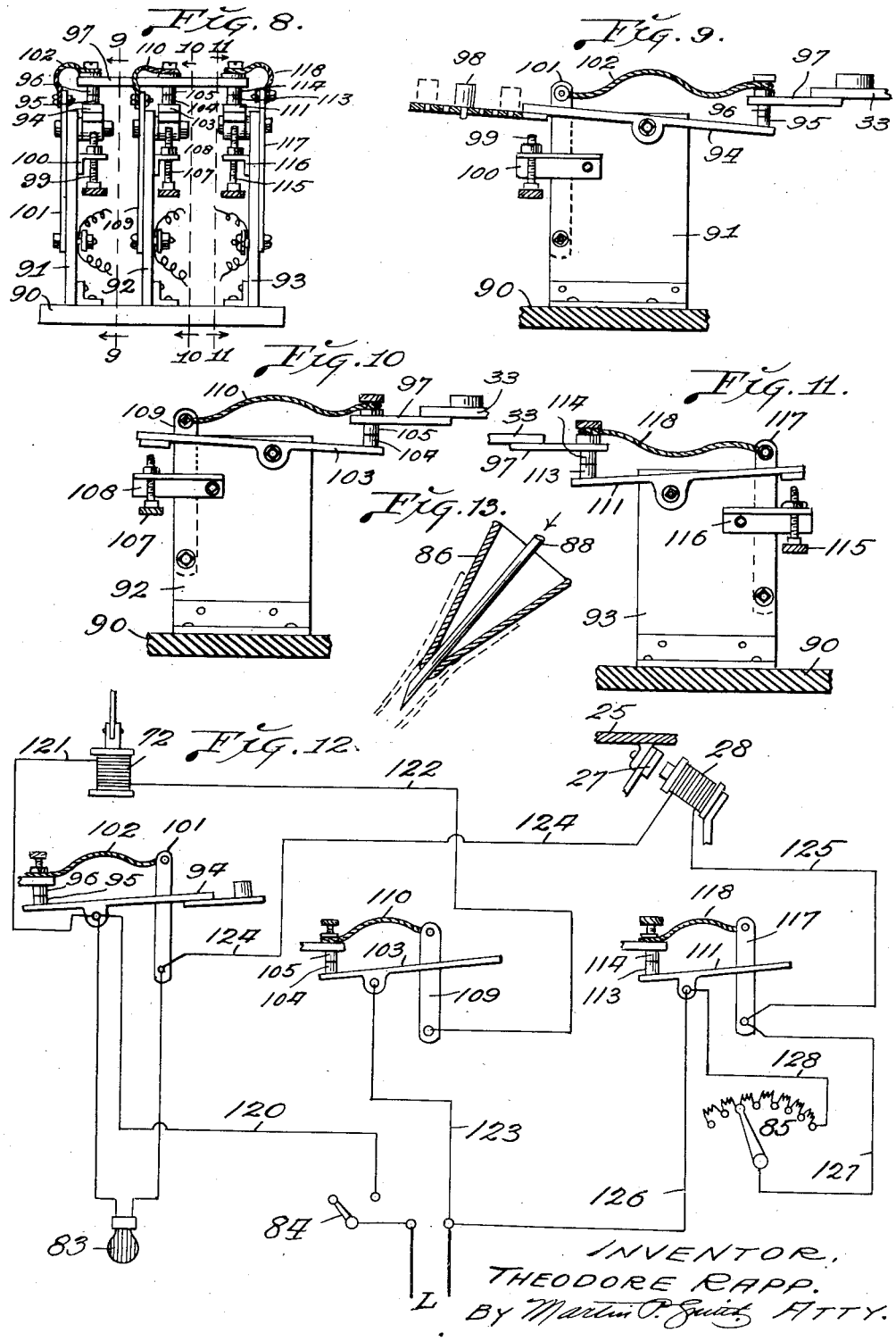

Patented May 10, 1938

2,116,934

UNITED STATES PATENT OFFICE 2,116,934

WEIGHING AND PACKAGING MACHINE

Theodore Rapp, Los Angeles, Calif.

Application April 17, 1935, Serial No. 16,759

28 Claims. (Cl. 249—60)

My invention relates to a combined weighing and packaging machine especially designed for the comparatively rapid and accurate weighing and packaging of predetermined amounts of food products or the like and the construction herein set forth is an improvement on a similar machine forming the subject matter of an application for U. S. Letters Patent filed by me January 9, 1934, Serial No. 705,863.

The principal objects of my present invention are, to generally improve upon and simplify the construction of the weighing and packaging machine disclosed in my aforesaid co-pending patent application as well as other existing forms of weighing and packaging machines and further, to provide a relatively simple, practical and inexpensive machine that may be conveniently and economically employed for the weighing of predetermined amounts of products such as coffee, rice, dried beans and peas, candy, macaroni, nut meats and the like and delivering the weighed amounts of product into bags or other containers which after being closed or sealed are ready for delivery to the purchasers.

Further objects of my invention are, to combine with the beam of a conventional weighing scale, a support for the containers that receive the weighed product and to provide simple and efficient means whereby the product is fed from a hopper into the receptacles in such a manner as to expedite the filling and weighing of said receptacles.

A further object of my invention is, to provide an automatic control for the operation of the material feeding means so as to insure accuracy in the weighing of the predetermined amounts of product that pass through the machine and which automatic control includes switches located in an electric circuit and the latter including means for imparting vibratory movement to certain parts of the product handling and feeding means.

Further objects of my invention are, to provide adjustable means for supporting the bags or containers that receive the weighed product in order that bags or containers of different lengths may be filled by the machine, further, to provide automatic means for opening the bags prior to the time that they are placed on the supporting means and further, to provide a machine of the character referred to that is at all times under ready control of an operator or attendant so as to expedite and minimize the time and labor involved in the weighing and packaging of predetermined amounts of food products.

With the foregoing and other objects in view my invention consists in certain novel features of construction and arrangements of parts that will be hereinafter more fully described and claimed and illustrated in the accompanying drawings in which:

Fig. 3 is a plan view of the upper front portion of the machine.

Fig. 4 is a front elevational view of the spout that discharges the weighed material into the bags or containers and also showing the frame that supports said hopper.

Fig. 5 is a detail vertical section of the means utilized for clamping the upper rear portion of a bag to the spout.

Fig. 6 is a plan view of the parts seen looking in the direction indicated by the arrow 6 in Fig. 5.

Fig. 7 is an enlarged vertical section taken on the line 7—7 of Fig. 3.

Fig. 7A is an elevational diagrammatic view of a modified form of the means utilized for clamping the open upper end of a bag to the spout.

Fig. 8 is an end view of the automatically operating electric switches utilized in connection with my improved weighing and packaging machine.

Fig. 9 is a vertical section taken on the line 9—9 of Fig. 3.

Fig. 10 is a vertical section taken on the line 10—10 of Fig. 8.

Fig. 11 is a vertical section taken on the line 11—11 of Fig. 8.

Fig. 12 is a diagram of the electrical circuits and switches utilized in my improved weighing and packaging machine.

Fig. 13 is a detail sectional view of a head that is utilized for blowing open bags by means of a jet of air.

Figure 1:
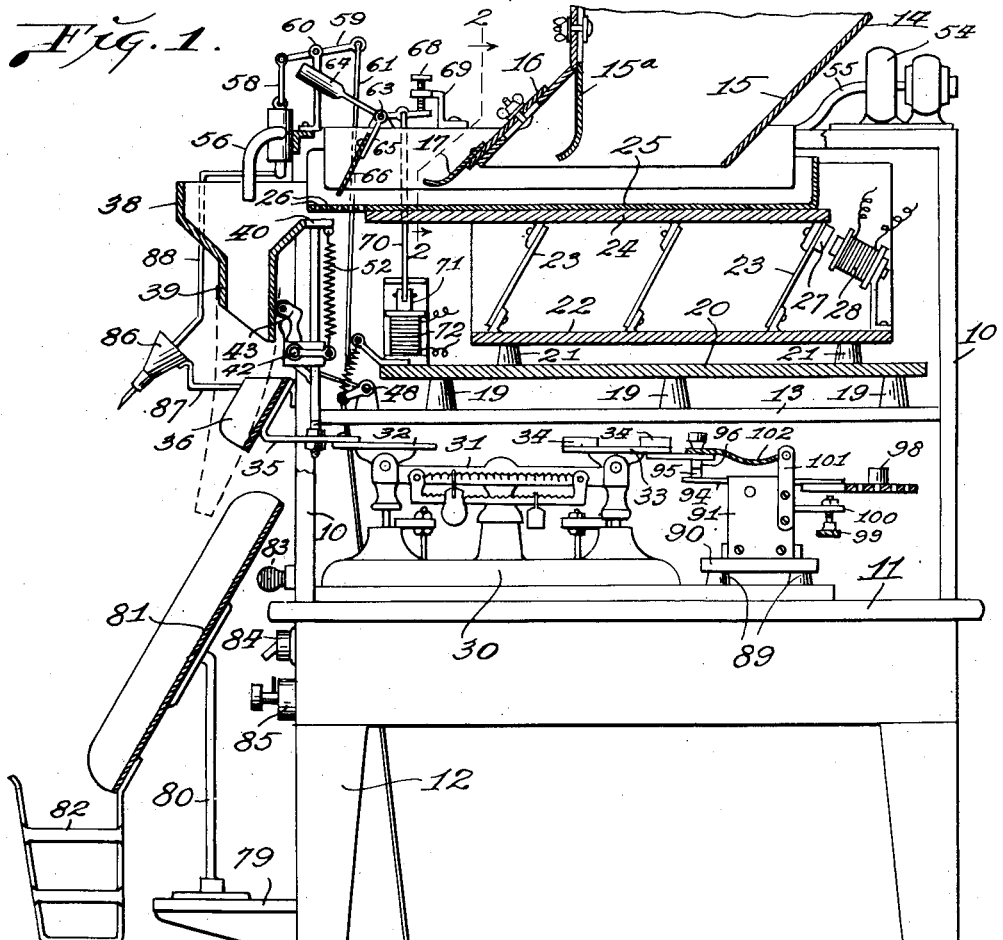
Fig. 1 is a side elevational view partly in section of an automatic weighing and packaging machine constructed in accordance with my invention.
Figure 2:
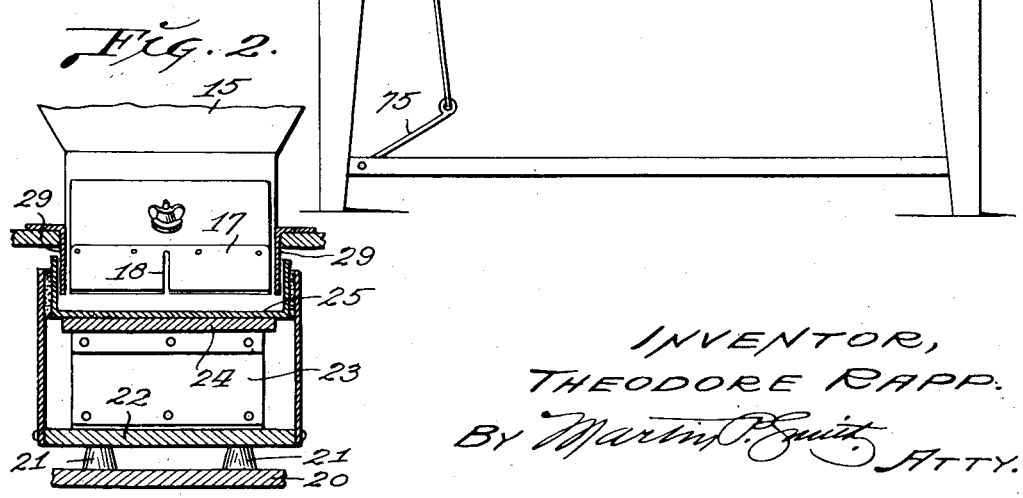
Fig. 2 is a vertical cross section taken on the line 2—2 of Fig. 1.

Referring by numerals to the accompanying drawings which illustrate a preferred embodiment of my invention, 10 designates a substantially rectangular skeleton frame, preferably formed of angle iron suitably braced and said frame is secured on table top 11 and the latter supported by legs 12.

The table top 11 supports the weighing scale and the automatic electric switches and mounted in frame 10, above and parallel with said table top 11, is a platform 13 that supports the electric vibrator and other operating parts of the machine.

Suitably secured on top of frame 10, is a hopper 14, having a downwardly and forwardly inclined spout 15 that projects a short distance below the top of frame 10 and mounted for vertical adjustment on top of the front wall of spout 15, is a plate 16.

Secured to and projecting downwardly and forwardly from the lower portion of this plate, is a plate 17 of thin resilient metal, the lower end of which is bent upwardly and forwardly and said plate is provided in its lower portion at a point midway between its side edges with a slot 18. This plate is designed to cause the material to feed evenly forwardly from the front portion of the spout and the metal forming said plate 17 is extremely flexible so that it will readily ride over the larger pieces of material that pass through the feeding trough.

Supported by rubber blocks 19 on platform 13, is a secondary platform 20 and supported on the latter by blocks 21 of rubber, is a plate 22.

Secured to this plate are the lower ends of upwardly projecting rearwardly inclined plates 23 of thin resilient metal and secured to the upper ends of these plates, is a horizontally disposed plate 24.

Plate 24 carries a material feeding trough 25 that occupies a horizontal position in the upper portion of frame 10 and the forward portion of the bottom of this trough is perforated as designated by 26 in order to permit fine granular material that is shaken off the product that passes through the trough to discharge downwardly through the plate before the material that is being weighed and packaged passes into the filling spout.

Secured to the upper portion of the rear one of the resilient plates 23, is an armature 27 and positioned adjacent thereto, is the core of an electromagnet 28.

Secured to the top of frame 10 and projecting downwardly inside the side walls of trough 25, are vertically disposed plates 29 and which plates are positioned to the sides of the lower portion of spout 15.

Positioned on the forward portion of table top 11, is a conventional weighing scale 30 provided with the usual tilting beam 31, the forward end of said beam carrying a plate 32 and the rear end of said beam carrying a plate 33.

Mounted on plate 33 are weights 34, which counter balance the weight of the operating parts of the machine that are supported by plate 32.

A bracket 35 that is secured to plate 32 carries a chute 36 that is positioned in front of frame 10 adjacent platform 13 and adjustably seated on opposite sides of this plate, are the lower ends of vertically disposed rods 37. Suitably supported by the upper ends of these rods, is the enlarged upper end of a spout 38, the lower portion 39 of which is substantially tubular in form and occupying a position directly above the upper end of chute 36.

The forward end of trough 25 projects into the enlarged upper end of spout 38, as illustrated in Fig. 1 and that portion of the spout immediately below the perforations 26 in the bottom of the chute is cut away, as designated by 40, in order to permit dust and fine particles of material to discharge downwardly through the perforations 26.

Adjustably mounted on the upright rods 37, are blocks 41 that provide bearings for a horizontally disposed shaft 42 and secured on the intermediate portion of this shaft 42 is a vertically disposed finger 43.

Journaled in the upper end of this finger is a roller 44 of rubber or other suitable material. This roller is utilized for holding the upper rear wall of a container such as a paper bag against the lower rear portion of spout 38 and for the accommodation of said roller and the interposed portion of the wall of the bag, a recess 45 is formed in the outer face of the rear portion of the spout.

Finger 43 projects a short distance below shaft 42 and carried by the lower end of said finger is a roller 46. This roller is engaged by the forward portion of an arm 47 that is mounted on a transversely disposed shaft 48 and the latter being journaled in suitable bearings 49 on the forward portion of platform 13.

Secured on the front face of the lower portion of finger 43, is an upwardly projecting resilient finger 50, the upper end of which is slightly curved rearwardly and said resilient finger functioning as a guide for the rear wall of the bag when the open end thereof is applied to the lower portion of spout 38.

Secured to one end of shaft 42 is a short horizontally disposed arm 51 and secured to the outer end thereof is the lower end of a retractile spring 52, the upper end of which is secured to the upper rear portion of spout 38. This spring tends to normally hold roller 44 against the lower portion of spout 38, as illustrated in Fig. 5.

The means utilized for opening the bag that is applied to the lower end of spout 38, includes a cylinder 53 that is mounted on the front portion of frame 10 to the side of spout 38 and leading from a motor driven fan or blower 54 that is mounted at a suitable point on frame 10, to the lower end of this cylinder 53, is an air duct 55.

Leading from the intermediate portion of cylinder 53, laterally and downwardly, is a duct or pipe 56 that discharges downwardly into the upper portion of spout 38.

Arranged for sliding movement in cylinder 53 is a valve 57, to the upper end of which is pivotally connected a link 58 and the upper end of this link is pivotally connected to a lever 59 fulcrumed on a bracket 60.

Pivotally connected to the rear end of lever 60, is a depending rod 61, the lower end of which is pivotally connected to a short arm 62 that is carried by the shaft 48 so that when the latter is partially rotated, the valve 57 through connections 58, 59 and 61 will be elongated to permit air to pass from duct 55 through the lower portion of cylinder 53 and discharge through and from pipe 56.

Journaled in bearings on top of frame 10, above the forward end of trough 25, is a transversely disposed shaft 63 and projecting forwardly and upwardly from the central portion of this shaft, is an arm carrying a weight 64.

Carried by the intermediate portion of shaft 63, is a plate 65 that projects downwardly and forwardly into the forward portion of trough 25 and mounted for vertical adjustment on the lower portion of this plate, is a second plate 66.

Projecting at right angles from shaft 63 near one end, is an arm 67, the free end of which normally engages beneath the point of an adjustable stop screw 68 that is seated in a bracket 69.

Pivotally connected to the intermediate portion of arm 67, is the upper end of a depending rod 70, the lower end of which is pivotally connected to the armature 71 of a vertically disposed magnet coil 72, the latter being positioned on platform 20.

Weight 64 tends to rock shaft 63 so that the lower portion of plate 66 occupies a position in the lower portion of the forward end of trough 25 and the parts are held in such position by the engagement of arm 67 against the adjustable stop screw 68.

When coil 72 is energized, core 71 will be drawn downward and through rod 70 and arm 67 shaft 63 will be rocked to swing plates 65 and 66 forwardly and upwardly so as to permit free flow of material through the vibrating trough 25.

Mounted on shaft 48, is a short arm 73, to which is pivotally connected the upper end of a pull rod 74 that extends downwardly through the front portion of the machine and the lower end of said rod is pivotally connected to a pedal 75 that is hinged to a cross member that is positioned between the front legs of the machine. This pedal, pull rod and arm are utilized for imparting partial rotary movement to shaft 48.

Carried by shaft 48 is an arm 76, to the outer end of which is connected the lower end of a retractile spring 77 and the upper end of this spring is connected to a bracket 78 on the front portion of platform 20. This spring acting through arm 76 tends to rotate shaft 48 so as to elevate the outer ends of the arms 47, 62, 73 and 76.

Supported by the front legs of the machine below the table top 11, is a table 79 and projecting upwardly therefrom is a standard 80 that supports an inclined chute 81 and which chute is positioned directly below chute 36.

Depending from the lower end of chute 81, is a basket or skeleton receptacle 82 that receives the filled containers after the same have been weighed and released from the lower end of spout 38.

Positioned on the front portion of the machine convenient to the operator who sits in front of said machine, is a lamp 83, preferably red, that is connected so that it is lighted while the machine is in operation or while the material is being fed into the bags and also located on the front of the machine is a conventional electric switch 84 that controls the current supply to the machine, also an adjustable rheostat 85 that controls the flow of current to the magnet coil 28 that is instrumental in imparting vibratory movement to the trough 25.

In order to quickly and conveniently open the bags that receive the weighed product prior to their application to the lower portion 39 of the spout 38, a hollow conical member 86 is supported by a bracket 87 in front of the lower end of spout 39 and extending axially through this hollow conical member, is a small tube 88 that leads from pipe 55 and which latter leads from the blower 54 to the lower end of cylinder 53. The lower end of this tube 88 extends a short distance below the lower end of conical member 86 and the projecting end of said tube is cut off at an angle.

This construction illustrated in Fig. 13, enables the operator to position the open upper end of a bag around the lower portion of member 86 and the jet of air issuing from the open lower end of tube 88 acts instantly to completely open the bag before the same is applied to the lower end 39 of the spout 38.

Supported by rubber blocks 89 on table top 11 to the rear of the scale 30, is a small platform 90 of insulating material and secured thereto and projecting upwardly therefrom, are three parallel panels 91, 92 and 93 of insulating material.

Pivotally mounted on the upper portion of panel 91, is an arm 94 of conducting material and projecting upwardly from the front end thereof, is a contact 95. This contact is adapted to engage a corresponding contact 96 that is carried by an arm 97, the latter projecting rearwardly from scale platform 33.

Adjustably mounted on the rear portion of arm 94, is a counterbalancing weight 98 and the downward swinging movement of the rear end of arm 94 is limited by a stop screw 99 that is adjustably seated in bracket 100 that is secured to and projects from the panel 91.

Secured to the side face of panel 91, adjacent its rear vertical edge, is a metal strap 101 and the upper end of this strap is electrically connected to contact 96 by a small flexible cable 102.

The structure just described constitutes an electric switch that is actuated by the rear one of the scale platform 33 and which switch causes the material feeding chute 25 to operate at relatively slow speed to produce a dribble feed during the latter portion of the bag filling operation, or during that period of time that the final amount of material is being delivered into the spout 38 to complete the predetermined amount of the material that is weighed and packaged at each operation.

Pivotally mounted on the upper portion of panel 92, is a metal arm 103 and projecting upwardly from the front end thereof is a contact point 104. This point is adapted to engage a corresponding point 105 that is carried by an arm 97 that projects from platform 33.

The downward movement of the rear end of arm 103 is limited by a stop screw 107 that is adjustably seated in a bracket 108 that projects from panel 92.

Secured on the side of panel 92, adjacent its rear edge, is a metal strip 109 that is electrically connected to contact point 105 by a small flexible metal cable 110.

The construction just described constitutes a switch actuated by the scale platform 33 and which controls the flow of current to coil 72, which latter, when energized opens the material flow control gate comprising the plates 65 and 66.

Pivotally mounted on the upper portion of panel 93, is an arm 111, and projecting upwardly from the front end of said arm is a contact point 113. This point is adapted to engage a contact point 114 that is carried by plate 97 that projects from scale platform 33.

The downward swinging movement of the rear end of arm 111 is limited by a stop screw 115 that is adjustably seated in bracket 116, the latter being mounted on panel 93.

Secured on the side face of panel 93 near its rear edge, is a metal strip 117 and the latter is electrically connected to contact point 114 by a small flexible metal cable 118.

At the beginning of the weighing and packaging operations, the operator seated in front of the machine depresses the pedal 75 and through rod 74 and arm 73 partial rotary motion is imparted to rock shaft 48. The finger 47 carried by the rock shaft bearing on roller 46 swings the upper end of finger 43 away from the lower portion 39 of spout 38 during which movement shaft 42 is partially rotated and pressure roller 44 is moved away from its notch 45.

The open upper end of the bag is now moved upward around the lower portion 39 of the spout and the upper portion of the rear wall of the bag is guided, during such movement by the resilient finger 50.

As rock shaft 48 is partially rotated, arm 62 will draw rod 61 downward, thereby swinging lever 59 on its fulcrum, with the result that valve 57 is drawn upward through housing 58, which permits air from the blower 54 to pass from tube 55 through the lower portion of the cylinder and through tube 56 and the air discharging from said last mentioned tube will open the lower portion of the bag that has been applied to the lower portion 39 of the spout.

In this connection it may be stated that the bag opener comprising the parts 68 and 69 is used for opening what is known to the trade as satchel bottom bags. Other types of bags are readily opened by the blast of air that is discharged downwardly through the spout by tube 56.

After the bag has been opened and applied to the lower end of the walled spout as just described, the operator removes pressure of the foot from the pedal 75 and the retractile spring 77 which was expanded as the pedal was depressed, will act to rock the shaft 48 in the reverse direction so as to permit valve 57 to close and raise finger 47 from roller 46.

Retractile spring 52 connected to arm 51 that is mounted on the end of shaft 42 will now act to swing the upper end of finger 43 toward the filling spout so that roller 44 engages and presses the upper portion of the rear wall of the bag into notch 45 so as to hold said bag suspended from the lower end of the spout and with the intermediate or lower portion of the bag resting on chute 36.

Under normal conditions or before the scale beam is tilted under the predetermined weight of product delivered into a bag suspended from the lower portion of spout 38, the rear platform 33 of the scale is at its lowermost position and when in such position the contacts 96, 105 and 114 are in engagement respectively with contacts 95, 104 and 113 and the rear ends of the arms 94, 103 and 111 are elevated as illustrated in Figs. 9, 10 and 11.

The stop screws 107 and 115 are adjusted so that the downward movement of the rear ends of the arms 103 and 111 is arrested at practically the same instant and thus as the platform 33 continues to move upward as the scale beam is tilted by the weight of the material delivered into the bag, contact will be broken practically simultaneously between the contacts 104 and 105 and by the contacts 113 and 114.

Stop screw 99 is adjusted so that contacts 95 and 96 remain in engagement with each other for a short period of time after contacts 104 and 105 and 113 and 114 have been separated and which arrangement is necessary to bring about a low speed operation of the vibrating trough during the final portion of the feeding material into the bag, in other words, restricting the flow of material through the vibrating trough and into the spout for a short period of time just prior to the time that the predetermined amount of material has been delivered into the bag so as to tilt the scale platform to its limit of movement.

After the bag has been properly applied to the lower end of spout 38, the operator closes switch 84 so that current from one side of the line L passes through a conductor 120 to arm 94, thence through a conductor 121 to coil 72, thereby energizing the same.

From coil 72 the current passes back to the other side of the line through a conductor 122, contact strip 109, cable 110, contacts 105 and 104, arm 103 and conductor 123, that connects said arm 103 to the other side of the line.

As coil 72 is energized, its core is drawn downward and rod 70 that is connected to said core draws arm 67 downward, thereby rocking shaft 63 and raising the gate comprising the parts 65 and 66 so that the material being weighed and packaged may be discharged freely from trough 25 into the spout 38.

This condition exists as long as the trough is operating at high speed.

From arm 94, the current delivered into and through conductor 120 divides and a portion of said current passes through contacts 95 and 96, thence to and through cable 102, contact strip 101, to and through a conductor 124 that leads from said strip to vibrator coil 28 and from said vibrator coil the current passes through a conductor 125 to contact strip 117, thence through cable 116, contacts 114 and 113, arm 111 and thence through a conductor 126, back to the other side of the line.

As vibrator coil 28 is energized, it attracts and repels armature 27, thereby imparting rapid or high speed vibratory movement to plate 24 carrying trough 25 so that the product delivered into said trough by the hopper 15, will be fed forwardly and discharged from the forward end of said trough into spout 38.

Hopper 15 may be provided in its forward portion with a vertically adjustable feed control gate 15ᵃ and the spring plate 17, which is extremely flexible and resilient, acts as a spreader to cause the material feeding forwardly through the trough to feed evenly without piling up.

Inasmuch as the gate comprising the parts 65 and 66 is elevated during this feeding movement, the product discharges freely from the end of the trough into the spout 38 and passes from thence into the bag that is suspended from said spout.

Any dust or small particles of material that may be shaken off the product that is passing through the trough 25 will discharge through the perforations 26, that is formed in the forward portion of the bottom of said trough and thus such waste material will be prevented from discharging into the bags.

Just before the scale platform 33 reaches its upper limit of movement due to the rocking of the scale beam by the weight of the product delivered from the vibrating trough into the bag, the rear ends of arms 103 and 111 will engage stop screws 107 and 115 so as to limit further swinging movement of said arms and as the scale platform continues to move upward contacts 105 and 114 will leave contacts 104 and 113, thus opening the circuit to coil 72 and as the latter is deenergized, the weight 64 will swing gate comprising parts 65 and 66 downward into the position shown in Fig. 1, so as to restrict the flow of the product through the vibrating trough.

At this time the weighted end of arm 94 has not yet come into contact with stop screw 99 so that contacts 95 and 96, which control the slow speed vibration of the trough, are still in contact with each other.

When the contacts 113 and 114 have separated as just described, the current after passing through vibrator coil 28 and conductor 125, will pass through contact strip 117 and a conductor 127 to resistance 85, from thence through a conductor 128 to arm 111 and from thence through conductor 126 to the other end of the supply line.

Thus the resistance coil is cut into circuit with vibrator coil 28 so that the latter will operate the trough at reduced speed or with slight vibration, thus providing a dribble feed beneath the lowered gate at the discharge end of the vibrating trough with the result that the product will feed slowly through said trough and discharge into the bag filling spout during the latter portion of the delivery of the predetermined amount of product into the bag.

Weight 98 is adjustably mounted on the rear portion of arm 94 so as to control the timing of the dribble feed of material from the chute while the latter is operating at reduced speed to produce the dribble feed of material and this control is particularly essential while running relatively heavy material through the machine. Heavy material feeds forward faster than relatively light material and it is of course essential that the timing of the dribble feed be controlled so that the exact predetermined quantity of material will be delivered into spout 38 and the bag suspended therefrom.

By adjusting weight 98 rearwardly on its supporting arm 94, the pressure of contact 95 with contact 96, the latter being carried by the scale platform will be increased so as to prolong the time period of the dribble feed with the result that greater accuracy is obtained in weighing the predetermined amounts of material.

For example, while running relatively heavy material such as beans or sugar through the machine and it is desired to produce packages of one pound each, the weights of the scale are set so that the scale beam will start to tilt upon its axis when thirteen or fourteen ounces of the product have been run into the receptacle and adjusting screws 107 and 115 are set so as to stop the swinging movement of the contact carrying arms 103 and 111 and under such conditions the contacts 104 and 105 and 113 and 114 will open when thirteen or fourteen ounces of the product have been delivered into the receptacle.

When the contacts just mentioned open, gate 65, 66 will swing downward and as resistance 85 is cut into circuit with the trough 25 will operate at slow speed to produce a dribble feed of the product into the spout 38 and which condition exists as long as contacts 95 and 96 are closed.

The adjustment of the weight 98 on the rear end of arm 94 that carries contact 95 controls the degree of pressure of contact 95 with contact 96, which latter is carried by the scale platform and the latter yieldingly resists the upward movement of the contact 95 carried by the weighted arm until the exact amount of material has been delivered by the trough 25 operating at reduced speed into spout 38.

As a result of this arrangement an overrun of product and particularly the heavier products from the trough 25 into spout 38 at the end of the weighing operation or when the final ounce or two of product is being fed from the trough into the spout is prevented and accuracy in the weight of the predetermined amounts of material delivered into the containers is assured.

When running comparatively light material through the machine, weight 98 is adjusted forwardly on its supporting arm, thus decreasing the pressure of contact 95 with contact 96 so that the period of time of the dribble feed of the lighter material is shortened.

Resistance 85 is adjustable so that the reduced speed or retarded vibration produced by coil 28 may be accurately regulated.

When the exact predetermined amount of product has been delivered into the bag, the scale platform 33 will have been moved upward a sufficient distance to permit the weighted end of arm 94 to rest upon stop screw 99 and the final upward movement of the scale platform will separate contacts 95 and 96 and thus the circuit to the vibrating coil is opened and vibration of the feeding trough will cease.

The operator now depresses pedal 75 to swing finger 43 on its axis, thereby releasing the bag filled with product of the predetermined weight and the filled bag thus released will slide downward over chutes 36 and 81 and drop into basket 82.

The filled bag is now removed and an empty bag placed on the lower end of the filling spout and the bag filling and weighing operations are repeated.

In Fig. 7A I have illustrated a modified construction for swinging the bag engaging finger 43 away from the lower portion 39 of spout 38 and in this construction roller 46 is dispensed with and a short arm 120 is pivotally mounted on the lower portion of finger 43.

The forward end of this arm carries an armature 121 and the rear end of said arm carries a weight 122 that counterbalances and tends to elevate armature 121.

Suitably supported below the armature is an electromagnet 123.

Suitably supported on the frame of the machine, is a housing 124 within which is arranged a switch comprising a pair of resilient metal arms 125, the free ends of which are normally spaced apart and carry contact points 126.

Pivoted on the underside of housing 124 is a short lever 127, which when swung upon its axis engages one of the arms 125 and moves same upward to bring the contacts 126 into engagement with each other.

Connected to the lower end of lever 127 is a rod 128 that extends downwardly and is connected to a pedal 129 pivoted in the lower portion of the machine.

The contact carrying arms 125 are electrically connected to magnet coil 123 and to a suitable source of current supply.

When pedal 129 is depressed to actuate lever 127 and close the contacts 126, current will flow through coil 125 to energize same, thereby drawing armature 121 downward so as to swing finger 43 on its axis with the result that roller 44 carried by the upper end of said finger will be drawn away from the spout 39 to release the filled bag.

Thus it will be seen that I have provided a weighing and packaging machine that is relatively simple in construction, inexpensive of manufacture and very effective in performing the functions for which it is intended, namely, the comparatively rapid and accurate weighing and packaging of predetermined amounts of food products and the like.

It will be understood that minor changes in the size, form and construction of the various parts of my improved automatic weighing and packaging machine may be made and substituted for those herein shown and described without departing from the spirit of my invention, the scope of which is set forth in the appended claims.

I claim as my invention:

1. In an automatic weighing and packaging machine, the combination with a weighing scale and its beam, of a spout supported by one end of the scale beam, means for securing the open end of a container to the lower portion of said spout, a hopper, a trough arranged to receive material from said hopper, and discharge said material into said spout, adjustable means between the hopper and forward end of the trough for controlling the volume flow of material forwardly through said trough, means mounted for operation adjacent the forward end of the trough for controlling the discharge of material from said trough, which material discharge control means tends to move into the trough by gravity, electrically operated means for swinging said material discharge control means out of the trough, means for imparting vibratory movement of varying speeds to said trough and adjustable means for controlling the time period of change of speed of the vibratory movement imparted to said trough.

2. In an automatic weighing and packaging machine, the combination set forth in claim 1 and with means actuated by the scale beam when the same is tilted for controlling the operation of said trough vibrating means.

3. In an automatic weighing and packaging machine, the combination set forth in claim 1, with a gate mounted for swinging movement in the discharge end of said trough and means controlled by the tilting movement of the scale beam for causing said gate to swing outwardly and upwardly away from the discharge end of said trough.

4. In an automatic weighing and packaging machine, the combination set forth in claim 1, with means for directing a jet of air downwardly through said spout to open the bag suspended therefrom.

5. In an automatic weighing and packaging machine, the combination with a weighing scale and its beam, of means carried by one end of said beam for supporting containers, a hopper positioned above the scale, a trough positioned below the hopper, electrically actuated means for imparting vibratory movement to said trough, a gate hinged at the forward end of said trough, electrically operated means for swinging said gate outwardly and upwardly from the discharge end of said trough and means actuated by the tilting movement of the scale beam for controlling the operation of said trough vibrating means and said gate swinging means.

6. In an automatic weighing and packaging machine, a trough, means for imparting vibratory movement to said trough, a hopper arranged above said trough and discharging thereinto, a gate adjustably mounted on the lower portion of said hopper for controlling the discharge of material from said hopper into said trough, a gate hinged adjacent the discharge end of said trough and adapted to swing outwardly and upwardly and means for imparting swinging movement to said last mentioned gate.

7. In an automatic weighing and packaging machine, the combination set forth in claim 6, with a spout arranged beneath the discharge end of said trough and means for securing a container to the lower portion of said spout.

8. In a weighing and packaging machine, a vibratory trough, a hopper arranged above said trough, a material flow control member of resilient material adjustably mounted on the lower forward portion of said hopper and extending downwardly into said trough, a material flow control gate mounted for swinging movement within the discharge end of said trough and means for swinging said gate forwardly and upwardly.

9. In a weighing and packaging machine, the combination with a vibratory trough and means for imparting variable vibratory movement thereto, of a spout arranged beneath the discharge end of said trough, means for securing the upper ends of containers around the lower portion of said spout, a receptacle support disposed below said spout and container securing means, a weighing scale carrying said spout, said receptacle securing means, and said receptacle support and means for directing a jet of air downwardly through said spout to open the container attached thereto.

10. In a weighing and packaging machine, the combination with a vibratory trough, of a spout arranged beneath the discharge end of said trough, means for securing the upper ends of containers around the lower portion of said spout, means for directing a jet of air downwardly through said spout to open the container attached thereto, a chute arranged beneath said spout and a receptacle carried by the lower end of said chute.

11. In a weighing and packaging machine, the combination with a vibratory trough and means for vibrating same, of a spout arranged beneath the discharge end of said trough, means for securing the upper ends of containers around the lower portion of said spout, a receptacle support disposed below said spout and container securing means, a weighing scale carrying said spout, said receptacle securing means, and said receptacle support, means for directing a jet of air downwardly through said spout to open the container attached thereto and means for controlling the flow of said jet of air.

12. In an automatic weighing and packaging machine, the combination with a weighing scale and its beam, of a spout supported by one end of the scale beam, means for detachably securing containers to the lower portion of said spout, a trough arranged to discharge into said spout, electrically operated means for imparting vibratory movement to said trough, a hopper arranged above said trough and an electric circuit in which the trough vibratory means is located, switches located in said electric circuit, which switches are controlled by the tilting movement of the scale beams and means located in said electric circuit and controlled by one of the switches therein for causing the trough vibrating means to operate at reduced speed.

13. In an automatic weighing and packaging machine, the combination with a weighing scale, of a spout carried by one end of the scale beam, a trough arranged to discharge into said spout, a hopper arranged above the trough, a material flow control gate mounted for swinging movement in the discharge end of the trough, electrically operated means for imparting opening movement to said gate, electrically operated means for imparting vibratory movement to said trough, an electric circuit in which the gate operating means and the trough vibrating means are located and switches located in said electric circuit and actuated by the tilting movement of the scale beam for controlling the operation of said gate opening means and said trough vibrating means.

14. In an automatic weighing and packaging machine, the combination with a weighing scale, of a spout carried by one end of the scale beam, means for detachably securing containers to the discharge end of said spout, a trough arranged to discharge into said spout, electrically operated means for imparting vibratory movement to said trough, an electric circuit in which said trough vibrating means is located, a rheostat located in said circuit, a pair of switches located in said circuit and actuated by the tilting movement of the scale beam for opening and closing said electric circuit and one of which switches controls the flow of current through the circuit to the rheostat to cut down the speed of the trough vibrating means.

15. In an automatic weighing and packaging machine, the combination with a weighing scale and its beam, of means carried by one end of said beam for supporting containers, a hopper, a trough mounted below said hopper with one end arranged to discharge into the container supporting means, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, electrically actuated means for imparting different degrees of vibratory movement to said trough, means actuated by the tilting movement of the scale beam for controlling the operation of said electrically actuated trough vibrating means and adjustable means for fixing the time period of change of speed of the vibratory movement imparted to said trough.

16. In an automatic weighing and packaging machine, the combination with a weighing scale and its beam, of means carried by one end of said beam for supporting containers, a hopper, a trough mounted below said hopper with one end arranged to discharge into the container supporting means, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, electrically actuated means for imparting different degrees of vibratory movement to said trough, means actuated by the tilting movement of the scale beam for controlling the operation of said electrically actuated trough vibrating means and adjustable means whereby the electrically actuated trough vibrating means is caused to change the speed of vibratory motion imparted to said trough at any predetermined time during the latter part of the receptacle filling operation.

17. In an automatic weighing and packaging machine, the combination with a weighing scale and its beam, of means carried by one end of said beam for supporting containers, a hopper, a trough mounted below said hopper with one end arranged to discharge into the container supporting means, adjustable means between the hopper end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, electrically actuated means for imparting different degrees of vibratory movement to said trough, means actuated by the tilting movement of the scale beam for controlling the operation of said electrically actuated trough vibrating means, means whereby the electrically actuated trough vibrating means is caused to operate at relatively high speed during the first part of the receptacle filling operation and at slow speed during the latter part of the receptacle filling operation and adjustable means for controlling the time period of change from high speed to slow speed operation of said trough.

18. In an automatic weighing machine, a scale beam having weighing means at one end for receiving material and a balance weight at its opposite end, vibratory means for feeding the material to the weighing means, means for vibrating the feeding means to feed the material at a fast rate during the major portion of the weighing operation and a slower rate adjacent the end of the operation, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, counterbalancing means for applying a force to the weighted end of the scale beam to tilt the latter during the weighing operation, and means actuated by the tilting movement of the scale beam for controlling the vibrating means to effect a change from the fast to the slower rate of feed, said counterbalancing means being adjustable to apply a force of any magnitude to the weighted end of the scale beam to effect the change from a fast to a slower rate of feed at a predetermined time.

19. In an automatic weighing machine, a scale beam having means at one end for receiving material to be weighed and a balance weight at the opposite end, vibratory means for feeding the material into the weighing means, means for vibrating the feeding means to feed the material at a fast rate during a greater portion of the weighing operation and at a slower rate adjacent the end of the operation, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, means actuated by the tilting movement of the scale beam for controlling the vibrating means to effect a change from the fast to a slower rate of feed, a pivoted lever having one end engaging the weighted end of the scale beam, and a counterbalancing weight on the opposite end of the lever for tilting the scale beam during the weighing operation.

20. In an automatic weighing machine, a scale beam having means at one end for receiving material to be weighed and a balance weight at the opposite end, vibratory means for feeding the material into the weighing means, means for vibrating the feeding means to feed the material at a fast rate during a greater portion of the weighing operation and at a slower rate adjacent the end of the operation, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, means actuated by the tilting movement of the scale beam for controlling the vibrating means to effect a change from the fast to a slower rate of feed, a pivoted lever having one end engaging the weighted end of the scale beam, a counterbalancing weight on the opposite end of the lever for tilting the scale beam during the weighing operation, said counterbalancing weight being adjustable on the lever to vary the time at which the scale beam is tilted, and a stop for limiting the movement of the lever.

21. In an automatic weighing machine, a scale beam having means at one end for receiving material to be weighed and a balance weight at the opposite end, vibratory means for feeding the material into the weighing means, means for vibrating the feeding means to feed the material at a fast rate during a greater portion of the weighing operation and at a slower rate adjacent the end of the operation, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, means actuated by the tilting movement of the scale beam for controlling the vibrating means to effect a change from the fast to a slower rate of feed, a pivoted lever having one end engaging the weighted end of the scale beam, a counterbalancing weight on the opposite end of the lever for tilting the scale beam during the weighing operation, a stop for limiting the movement of the lever, and means actuated by further tilting of the scale beam to arrest the vibration of the feeding means.

22. In an automatic weighing machine, a scale beam having weighing means at one end for receiving material and a balancing weight at the opposite end, vibratory means for feeding the material to the weighing means, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, an electric circuit including means for vibrating the feeding means to feed the material at a fast rate, means in the circuit including a circuit-breaker actuated by the tilting movement in the scale beam for controlling the vibrating means to cause the material to be fed at a slower rate, and counterbalancing means for applying a force to the weighted end of the scale beam to tilt the latter during the weighing operation.

23. In an automatic weighing machine, a scale beam having weighing means at one end for receiving material and a balancing weight at the opposite end, vibratory means for feeding the material to the weighing means, adjustable means between the hopper and forward end of the trough for controlling the volume flow of material forwardly through said trough, means mounted for operation adjacent the forward end of the trough for controlling the discharge of material from said trough, said material discharge control means tending to move into the trough by gravity, electrically operated means for swinging said discharge control means out of the trough, an electric circuit including a magnet for vibrating the feeding means, a resistance in series with the magnet, a loop circuit including a circuit-breaker for bridging the resistance, said circuit-breaker being closed by the weighted end of the scale beam to bridge the resistance and operate the feeding means at a fast rate and opened by a tilting movement of the scale beam to operate the feeding means at a slower rate, and means for applying a force to counterbalance the weight on the scale beam to tilt the latter during a weighing operation, said counterbalancing means being adjustable to apply a force of any magnitude to the weighted end of the scale beam to effect a change from a fast to a slower rate of vibration at a predetermined time.

24. In an automatic weighing machine, a scale beam having weighing means at one end for receiving material and a balance weight at the opposite end, vibratory means for feeding the material to the weighing means, an electric circuit including means for vibrating the feeding means to feed the material at a fast rate during a greater portion of the weighing operation and at a slower rate during the latter part of the operation, a circuit-breaker for controlling the vibrating means and actuated by the tilting movement of the scale beam, and a pivoted lever having one end engaging the weighted end of the scale beam and applying a force to tilt the scale beam during the weighing operation to cause the feeding means to operate at a slower rate.

25. In an automatic weighing machine, a scale beam having weighing means at one end for receiving material and a balancing weight at the opposite end, vibratory means for feeding the material to the weighing means, an electric circuit including means for vibrating the feeding means to feed the material at a fast rate during a greater portion of the weighing operation and at a slower rate during the latter part of the operation, a circuit-breaker for controlling the vibrating means and actuated by the tilting movement of the scale beam, a pivoted lever having one end engaging the weighted end of the scale beam, a counterbalancing weight on the opposite end of the lever, said counterbalancing weight being adjustable along the lever and acting to tilt the scale beam at a predetermined time during the weighing operation to operate the feeding means at the slower rate, and a stop for limiting the movement of the lever.

26. In an automatic weighing machine, a scale beam having weighing means at one end for receiving material and a balancing weight at the opposite end, vibratory means for feeding the material into the weighing means, an electric circuit including a magnet for vibrating the feeding means to feed the material at a fast rate, a resistance in circuit with the magnet for decreasing the vibration of the feeding means to feed the material at a slower rate, a loop circuit for bridging the resistance, a pair of pivoted levers having contacts at one of their ends engaging contacts on the weighted end of the scale beam, said levers and scale beams forming circuit-breakers in the main circuit and loop circuit, one of said levers having a counterbalancing weight for tilting the scale beam, a stop for limiting the movement of the opposite lever to open the loop circuit, and a stop for limiting the movement of the weighted lever to open the main circuit upon further tilting movement of the scale beam.

27. In an automatic weighing machine, a scale beam having weighing means at one end for receiving material and a balancing weight at the opposite end, vibratory means for feeding the material into the weighing means, an electric circuit including a magnet for vibrating the feeding means, a resistance in the circuit for controlling the magnet to vibrate the feeding means at a slower rate, a loop circuit for bridging the resistance, a pair of pivoted levers engaging the weighted end of the scale beam, the main circuit and loop circuit being completed through the scale beam and respective levers, a stop for limiting the movement of the lever in the loop circuit, a counterbalancing weight on the other lever for tilting the scale beam during a weighing operation to open the loop circuit, said counterbalancing weight being adjustable along the lever to vary the time at which the scale beam is tilted, and a stop for the counterbalancing lever to open the main circuit upon further tilting of the scale beam.

28. In an automatic weighing machine, a scale beam having weighing means at one end for receiving material and a balance weight at the opposite end, vibratory means for feeding the material to the weighing means, a gate adjacent the end of the feeding means, an electric circuit including a magnet for vibrating the feeding means to feed the material at a fast rate during a greater portion of the weighing operation and at a slower rate during the latter part of the operation, a circuit including a magnet for operating the gate, a circuit-breaker for controlling the vibrating magnet, a second circuit-breaker for controlling the magnet operator for the gate, said circuit-breakers being actuated by the tilting movement of the scale beam, a pivoted lever having one end engaging the weighted end of the scale beam and applying a force to tilt the scale beam during the weighing operation whereby the circuit-breakers are actuated to cause the feeding means to operate at a slower rate and the gate to limit the amount of material advanced by the feeding means.

THEODORE RAPP.